United States Patent Office 3,479,410
Patented Nov. 18, 1969

3,479,410
SELECTIVE VAPOR PHASE METHYLATION
OF PHENOLS
Stephen B. Hamilton, Jr., Schenectady, N.Y., assignor to General Electric Company, a corporation of New York
No Drawing. Filed May 18, 1967, Ser. No. 639,282
Int. Cl. C07c 39/06, 37/12
U.S. Cl. 260—621                 5 Claims

ABSTRACT OF THE DISCLOSURE

This disclosure is concerned with a process for the vapor phase methylation of phenols having at least one o-hydrogen by passing a mixture of such phenols together with 2,4,6-trimethylphenol, over a magnesuim oxide or calcium phosphate catalyst bed at a catalyst bed temperature of from about 475° C. to 600° C. The methylated phenols produced in accordance with the process of this invention are useful in the preparation of polyphenylene oxides as described in U.S. Patent 3,306,874 and 3,306,875.

---

It is an object of this invention to selectively methylate phenols in the o-position by a transmethylation reaction.

It has been discovered that phenols having at least one of their o-positions vacant, can be selectively methylated employing 2,4,6-trimethylphenol, by passing a mixture of the first phenol and the trimethylated phenol over a catalyst bed in the vapor phase at 475° C. to 600° C.

In accordance with the process of the instant invention, an organic compound of the formula:

(I)

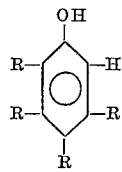

wherein each R is a monovalent substituent selected from the class consisting of hydrogen, methyl, phenyl and methyl-substituted phenyl, admixed with mesitol, is passed over a catalyst in the vapor phase, said catalyst being selected for the class consisting of magnesium oxide, calcium phosphate and magnesium oxide and calcium phosphate deposited on an inert substrate, while maintaining the temperature of said catalyst and reactants at from about 475° C. to about 600° C.

The process of this invention can be carried out in the conventional type of reactor used for vapor phase reactions over a solid catalyst. It is generally preferred to employ a tubular reactor; for example, a glass or metal tube which is filled with a static bed of the catalyst. The reactor can be heated by any conventional means; for example, it is conveniently heated either by surrounding the reactor with an electrical heater, a heated gas, or a liquid such as a fused salt bath, liquid metal, etc., which can be conveniently maintained at the reaction temperature by use of an immersion-type electrical heater. Because of the good heat transfer between a liquid and the reactor walls, a fused salt bath or other liquid medium generally gives the best temperature control of the reaction, although any means of heating may be used.

The organic compounds of Formula I and the mesitol can be mixed to form a solution which is then vaporized, or separate streams of the two reactants may be fed to the same or separate vaporizers and then to the reactor. In order to minimize decomposition in the vaporization of the reactants, the vaporizer may be maintained at a maximum temperature necessary to vaporize the reactants and the vapor of the reactants pre-heated prior to entering the reactor by passing the vapor through a metal or glass tube which is heated by the same heating medium used to heat the reactor. In this way no cooling of the initial part of the reactor occurs due to the necessity of heating the reactants up to the reaction temperature.

The ratio of reactants employed in the process of this invention is not narrowly critical and can vary from 1 to 10 moles of a phenol of Formula I to 10 to 1 moles of the mesitol. It is preferred, however, for ease of reaction and in order to obtain the highest yields, to employ the reactants in approximately equal molar ratios; that is, from 40 to 60 mole percent of the phenol of Formula I to 60 to 40 mole percent mesitol.

The temperature at which the process of this invention is conducted can range from about 475° C. to 600° C. It is preferred that the process of this invention be conducted at a temperature range of from about 490° C. to 510° C.

The pressure at which the process of this invention is conducted is not narrowly critical and can range from subatmospheric pressure to superatmospheric pressure. It is, of course, obvious to those skilled in the art that the pressure should be adjusted so as to maintain the reactants in the vapor phase when passing over the catalyst bed at the temperature at which the reaction is conducted.

Although a solvent is not necessary for the practice of the process of this invention, an inert solvent is sometimes desirable for ease of metering the reactants into the reaction chambers. Solvents which can be employed to dissolve the reactants are, for example, aromatic hydrocarbons such as benzene, toluene, xylene, etc. Inasmuch as the reaction is conducted in the vapor phase, one can also employ an inert carrier gas such as nitrogen, neon, krypton, etc., to promote the passage of the reactants through the catalyst bed.

The catalysts which can be employed in the process of this invention are, for example, magnesium oxide and calcium phosphate, either per se or as deposited on an inert filler such as charcoal.

Illustrative of the various phenols which can be methylated by the process of this invention are phenol itself, o-cresol, m-cresol, p-cresol, the various xylenols except 2,6-xylenol, for example, 2,3-xylenol, 2,4-xylenol, 2,5-xylenol, 3,5-xylenol, etc.; 2,3,4-trimethylphenol, 2,3,5-trimethylphenol, 3,4,5-trimethylphenol, 2,3,4,5-tetramethylphenol, etc.; o-phenylphenol, p-phenylphenol, 2-tolylphenol, 2,4-diphenylphenol, 2,3-diphenylphenol, 2-xylylphenol, 2-mesitolphenol, etc.

The vapors issuing from the reactor are condensed and the products separated in the usual fashion, for example, by crystallization, distillation, etc. The reaction proceeds smoothly at atmospheric pressure which makes it convenient to carry out the reaction since it eliminates the need for pressure equipment and any hazards from the use of high pressure.

As will be apparent to those skilled in the art, the process of this invention can be carried out under a variety of reaction conditions. These conditions are low rate of reactants, vapor space velocity of the reactants over the catalyst, contact time of the reactants with the catalyst, length of the catalyst bed, specific activity of the particular catalyst, etc. The effects of these reaction variables are those to be expected from a consideration of the technical aspects of the reaction involved.

Any magnesium oxide is suitable for use in the process of this invention. Preferably, the magnesium oxide should be as free as possible of oxides of compounds which tend to be acidic in nature such as aluminum oxide, silica, etc., but minor impurities of these materials can be tolerated. If such acidic materials are dense, e.g., fired to a temperature where they have fused or sintered, they become more or less inert and may be used as a support for the magnesium oxide without detrimental effect.

As would be expected, the reactivity of a given volume of catalyst is dependent upon the surface area of the catalyst exposed to vapors of the reactants. For a given particle size, the most reactive catalyst is that in which the particles are extremely porous. Porous particles of magnesium oxide may readily be obtained by thermal decomposition of particles of a thermally decomposable magnesium compound which does not melt nor sinter on heating. Magnesium carbonate, basic magnesium carbonate, and magnesium hydroxide make ideal compounds to be thermally decomposed to porous particles of magnesium oxide. The two magnesium carbonates give a more porous magnesium oxide than magnesium hydroxide, since they give off a greater volume of gas on being thermally decomposed. The more porous the catalyst, the greater volume a given weight of catalyst will occupy. If desired, the magnesium compound may be coated on an inert carrier and then thermally decomposed to give a porous magnesium oxide coating on the inert substrate. Magnesium oxide obtained by thermal decomposition will tend to sinter and become less porous if heated too hot. It is preferred to carry out the thermal decomposition of the magnesium compound in the same temperature range as the magnesium oxide will be exposed to in the process of this invention; that is, at the temperature range of 475° C. to 600° C. In this way a magnesium oxide which is thermally stable under the reaction conditions is obtained. In order for the magnesium oxide to be most effective, the entire reactor should be filled with particles of the magnesium oxide and maintained at the reaction temperature.

The methylated phenols produced in accordance with the process of this invention have known utility, for example, they can be employed as reactants in the oxidative coupling of phenols employing the processes as disclosed in U.S. Patents 3,306,875 and 3,306,874, Hay, issued Feb. 28, 1967, and assigned to the same assignee as the present invention to produce polyphenylene oxide polymers which are useful as molding compositions, to make gears, bearings, etc.

The following examples serve to further illustrate the invention. All parts are expressed as mole percentages unless otherwise exxpresly stated.

Example 1

Ortho-cresol (0.1 mol) was dissolved in 20 ml. of benzene and 2,4,6-trimethylphenol (0.1 mol) was dissolved in 20 ml. of benzene and the solutions mixed. The solution was heated to approximately 350° C. to vaporize all of the materials and the vapors passed over a magnesium oxide catalyst (54 grams, 150 ml. total volume), which was maintained at 500° C. at a rate of 30 ml. (liquid) per hour. The liquid hourly space velocity was thus 0.20 hour$^{-1}$.

The vapors were condensed and analyzed with the results as given in the following table:

TABLE I

| Reactants: | Mole percent |
|---|---|
| 2,4,6-trimethylphenol | 59 |
| Ortho-cresol | 41 |
| Products: | |
| o-Cresol | 26 |
| 2,6-dimethylphenol | 14 |
| 2,4,6-trimethylphenol | 44 |
| 2,4-dimethylphenol | 16 |

Example 2

Employing the procedure of Example 1, 2,4,6-trimethylphenol and phenol; and, 2,4,6-trimethylphenol and p-cresol were reacted at 500° C. over magnesium oxide. The results are given in Table II.

TABLE II

| Reactants, mole percent | Phenol | o-Cresol | p-Cresol | 2,6-xylenol | 2,4-xylenol | 2,4,6 tri-methyl-phenol |
|---|---|---|---|---|---|---|
| (1) 2,4,6 trimethyl phenol(55) phenol (45) | 22 | 19 | 8 | 5 | 21 | 26 |
| (2) 2,4,6 trimethyl phenol(56) p-cresol(44) | 3 | | 25 | 4 | 38 | 30 |

It will, of course, be apparent to those skilled in the art that modifications other than those set forth in the above examples can be employed in the process of this invention without departing from the scope thereof.

What is claimed is:

1. The process for methylating a phenol in the ortho-position which comprises passing an admixture of (A) a compound of the formula:

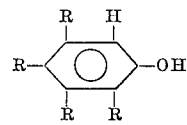

where each R is a monovalent substituent selected from the class consisting of hydrogen, methyl, phenyl and methyl substituted phenyl and (B) 2,4,6-trimethylphenol, in the papor phase over a catalyst selected from the class consisting of magnesium oxide, calcium phosphate and magnesium oxide and calcium phosphate on an inert substrate at a catalyst bed temperature of from 475° C. to 600° C.

2. The process as in claim 1 wherein compound A is phenol.

3. The process as in claim 1 wherein compound A is ortho-cresol.

4. The process as in claim 1 wherein the temperature is from 490° C. to 510° C.

5. The process as in claim 1 wherein the catalyst is magnesium oxide, compound A is phenol and the temperature is from 490° C. to 510° C.

References Cited

UNITED STATES PATENTS 2,003,941   6/1935   Kahl.
2,777,881   1/1957   Neuworth.
2,802,884   8/1957   D'Aleliu.

OTHER REFERENCES

Sowa et al., J. Am. Chem. Soc., 55 (1933), 3402–7.
Jelinek, Chem. Abs., vol. 55 (1961), p. 7357.

BERNARD HELFIN, Primary Examiner

W. B. LONE, Assistant Examiner

U.S. Cl. X.R.

260—619, 620